US008089978B2

(12) United States Patent
Glickman et al.

(10) Patent No.: US 8,089,978 B2
(45) Date of Patent: Jan. 3, 2012

(54) METHOD FOR MANAGING UNDER-RUN AND A DEVICE HAVING UNDER-RUN MANAGEMENT CAPABILITIES

(75) Inventors: Eran Glickman, Reshon Letzion (IL); Yaron Alankry, Ra'anana (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 402 days.

(21) Appl. No.: 12/093,111

(22) PCT Filed: Nov. 9, 2005

(86) PCT No.: PCT/IB2005/053680
§ 371 (c)(1),
(2), (4) Date: Aug. 14, 2009

(87) PCT Pub. No.: WO2007/054757
PCT Pub. Date: May 18, 2007

(65) Prior Publication Data
US 2009/0303872 A1    Dec. 10, 2009

(51) Int. Cl.
*H04L 12/56* (2006.01)
*H04J 3/17* (2006.01)

(52) U.S. Cl. ........ 370/412; 370/419; 370/433; 709/234; 710/52

(58) Field of Classification Search .......... 370/412, 370/419, 431, 433; 709/232–234; 710/22, 710/52, 53, 56, 57
See application file for complete search history.

(56) References Cited

U.S. PATENT DOCUMENTS

| 4,692,894 | A | * | 9/1987 | Bemis ............................. 710/57 |
| 4,942,553 | A | * | 7/1990 | Dalrymple et al. ............. 710/57 |
| 5,765,187 | A | * | 6/1998 | Shimizu et al. ................. 710/22 |
| 6,167,059 | A | | 12/2000 | Hagai et al. |
| 6,771,630 | B1 | | 8/2004 | Weitz et al. |
| 6,813,275 | B1 | * | 11/2004 | Sharma et al. .................. 710/52 |
| 6,898,261 | B1 | | 5/2005 | Hunter et al. |

FOREIGN PATENT DOCUMENTS

| EP | 0050434 A3 | 4/1982 |
| GB | 2392589 A | 3/2004 |
| JP | 1984045736 A | 3/1984 |

* cited by examiner

*Primary Examiner* — Aung S Moe
*Assistant Examiner* — Kerri Rose

(57) ABSTRACT

A device having under-run management capabilities and to a method for managing under-runs. The method includes providing, to a memory unit, channel information from multiple channels; allocating time slots for communication channel transmissions; the method is characterized by including: sending, during a time slot allocated for a transmission of channel information from an enabled communication channel, to the shift register channel information of an enabled communication channel, serially outputting the received channel information from the shift register towards a communication line while serially replacing the outputted channel information by a predefined content such that the shift register stores a communication channel disable code when an under-run occurs; defining a communication channel as a disabled communication channel once the under-run occurs; and transmitting, during a time slot allocated to a disabled communication channel, idle signals to the communication line.

20 Claims, 4 Drawing Sheets

METHOD FOR MANAGING UNDER-RUN AND A DEVICE HAVING UNDER-RUN MANAGEMENT CAPABILITIES

FIELD OF THE INVENTION

The invention relates to a device having under-run management capabilities and to a method for managing under-runs.

BACKGROUND OF THE INVENTION

In today's telecommunications, digital networks transport large amounts of information. Network services can be, for example, traditional voice phone, facsimile, television, audio and video broadcast, and data transfer.

With the increasing need of information exchange in the global society, the capacity of existing and future networks must be used efficiently. Multiplexers switch different network services to a single network in such a way that every service is fully maintained and does not disturb other services.

Communication integrated circuits use various techniques, such as time division multiplexing (TDM) to transmit information from multiple communication channels over a single communication line. Exemplary communication integrated circuits and TDM methods are illustrated in U.S. Pat. No. 6,771,630 of Weitz et al., and U.S. Pat. No. 6,167,059 of Hagai et al., both being incorporated herein by reference.

One disadvantage of TDM transmission is that an error in a transmission of channel information of a single communication channel can disrupt the transmission of channel information of other communication channels that share the same communication line. An under-run occurs when a certain communication channel does not have enough (or any) channel information to transmit during a time slot that is allocated for transmission of channel information from that certain communication channel.

An under-run can cause the transmission of channel information from multiple communication channels that share the same communication line to halt and data to be discarded. This unwanted result can occur from a failure of clock recovery and/or data recovery failures.

There is a need to provide efficient methods for managing under-runs as well as efficient devices having under-run management capabilities.

SUMMARY OF THE PRESENT INVENTION

A device having under-run management capabilities and a method for managing under-runs, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
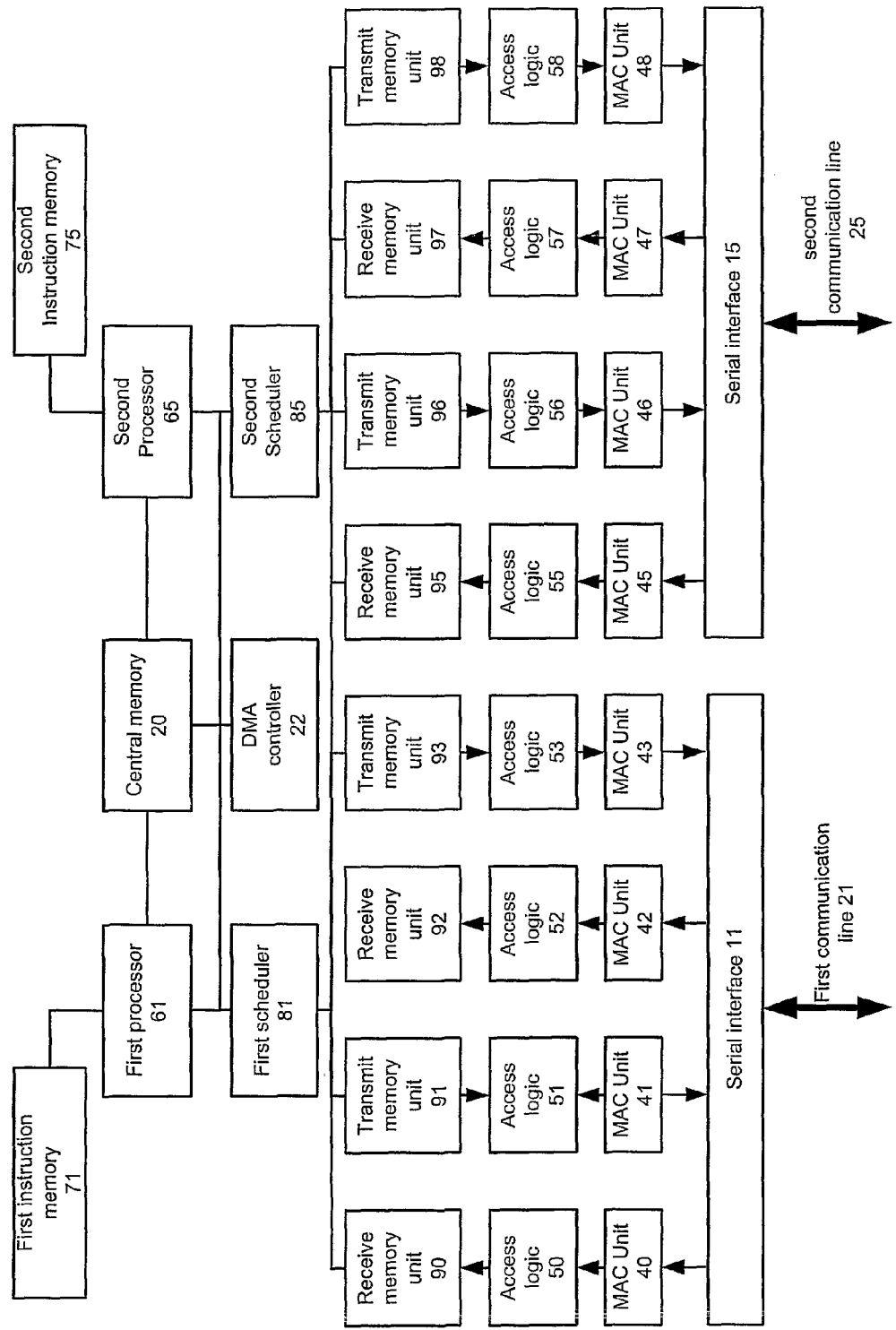
FIG. 1 illustrates a telecommunication device, according to an embodiment of the invention.

The invention illustrates a device that has under-run management capabilities. The device can be an integrated circuit such as but not limited to a telecommunication integrated circuit, but this is not necessarily so. The device can also include one or more integrated circuits or even other components, housing, power supply units and the like.

According to an embodiment of the invention a device is provided. The device includes a memory unit, a shift register, a memory unit controller, a communication line interface and a shift register logic. The memory unit is adapted to store channel information from multiple channels. The memory unit controller is adapted to control a provision of channel information from the memory unit to the shift register. The shift register logic is adapted to replace channel information outputted by the shift register by a predefined content such that when the shift register stores a communication channel disable code an under-run is detected. A communication channel that experienced an under-run is defined as a disabled communication channel. The shift register logic is further adapted to transmit, via the communication line interface, idle signals during the at least one later time slot allocated to disabled communication channel. The device is adapted to transmit channel information from enabled communication channels.

Conveniently, the shift register is used both as a data path for conveying channel information from enabled communication channels as well as control path that indicates that an under-run occurs.

Conveniently a processor writes channel information that is followed by a stop bit. The progress of the transmission can be monitored by tracking the stop bit. When the processor wishes to provide new channel information (of a certain communication channel) it reads a memory entry that stores either a communication channel disable code (if an under-run occurred) or stores channel information that was previously sent from the processor but not transmitted yet. If the latter occurs, the processor writes at least a portion of the new channel information and moves the stop bit from a previous location to the end of the currently provided channel information. This operation can be executed by utilizing a read-modify-write instruction. According to an embodiment of the invention the shift register logic includes a transmission process monitor that monitors the stop bit and sends a request to receive new channel information once the stop bit reached a predefined location.

According to an embodiment of the invention a method is provided. The method includes (i) providing, to a memory unit, channel information from multiple channels; (ii) allocating time slots for communication channel transmissions; (iii) sending, during a time slot allocated for a transmission of channel information from an enabled communication channel, to the shift register, channel information of an enabled communication channel, serially outputting the received channel information from the shift register towards a communication line while serially replacing the outputted channel information by a predefined content such that the shift register stores a communication channel disable code when an under-run occurs, (iv) defining a communication channel as a disabled communication channel once the under-run occurs; and (v) transmitting, during a time slot allocated to a disabled communication channel, idle signals to the communication line.

Conveniently, the stage of providing can include tracking the stop bit that precedes the channel information. The method includes monitoring the transmission process by tracking after the stop bit. Conveniently, a request to receive new channel information can be generated in response to the location of the stop bit. Conveniently, a determination of whether to provide new channel information can be responsive to the presence of the stop bit, and the amount of newly provided channel information is responsive to the location of the stop bit.

According to an embodiment of the invention the method includes performing a read-modify-write operation; whereas the read memory entry includes either a communication channel disable code (if an under-run occurred) or older channel information that was not transmitted yet. During the providing of new communication channel information the stop bit is moved to the end of the newly provided channel information.

Conveniently, by using the shift register as a data path as well as a control path (its content indicates that an under-run occurred) a highly efficient mechanism for tracking communication channels, and especially a large number of communication channels is provided.

FIG. 1 illustrates a telecommunication device 10, according to an embodiment of the invention.

The telecommunication device (also referred to as device) 10 is adapted to assemble and disassemble time division multiplexed (TDM) lines. It is connected to multiple data receivers (also referred to as data targets) and transmitters (also referred to as data sources). Device 10 is adapted to use routing tables in order to support a large number of TDM lines. It is noted that device 10 can also include at least one of the data targets and/or data sources.

Device 10 includes two serial interfaces 11 and 15, two processors 61 and 65, a central memory 20, two instruction memories 71 and 75, two schedulers 81 and 85, a direct memory access (DMA) controller 22, multiple receive and transmit MAC layer units (also referred to as MAC units) 40-48, multiple receive and transmit memory units 90-98 and associated access logics 50-58.

The first and second processors 10 and 65 can access the central memory 40. Each processor (out of 61 and 65) can access its own instruction memory (71 and 75 accordingly). The two schedulers 81 and 85 can control the access of the processors (61 and 65) to the memory units 90-98 and can also prevent a write request from a transmit memory unit to be sent to the processor when the read memory receives data segments.

Receive memory units such as units 90, 92, 95 and 97 receive data segments and data segment write requests from data sources. They decide which data segments to provide to the processors 61 and 65, via schedulers 81 and 85. The data segments are eventually read by processors 61 and 65. The receive memory units can receive status information from data sources. This status information can be related to data to be transmitted from device 10 to data targets.

Receive memory unit 90, access logic 50 and MAC unit 40 form a first reception path. Receive memory unit 92, access logic 52 and MAC unit 42 form a second reception path. Transmit memory unit 91, access logic 51 and MAC unit 41 form a first transmission path. Transmit memory unit 93, access logic 53 and MAC unit 43 form a second transmission path.

The first and second transmission paths and the first and second reception paths are connected to serial interface 11 and to first communication line 21. It is noted that each path can be connected to a separate communication line, or that a pair of paths can be connected to a single communication line.

Receive memory unit 95, access logic 55 and MAC unit 45 form a third reception path. Receive memory unit 97, access logic 57 and MAC unit 47 form a fourth reception path. Transmit memory unit 96, access logic 56 and MAC unit 46 form a third transmission path. Transmit memory unit 98, access logic 58 and MAC unit 48 form a fourth transmission path.

The third and fourth transmission paths and the third and fourth reception paths are connected to serial interface 15 and to second communication line 25. It is noted that each path can be connected to a separate communication line, or that a pair of paths can be connected to a single communication line.

Figure 2:
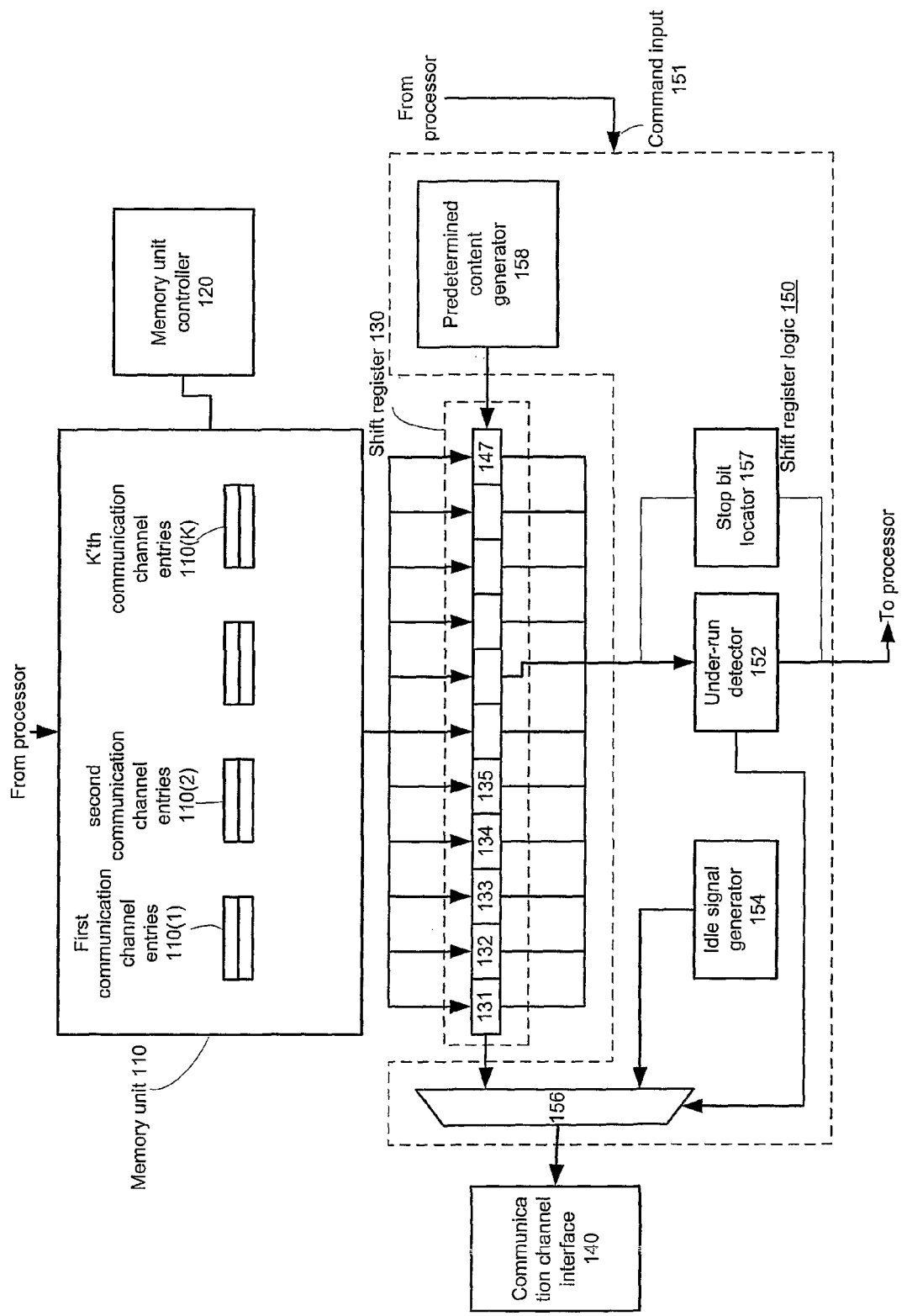
FIG. 2 illustrates a memory unit, a shift register and shift register logic, according to an embodiment of the invention.

Every MAC unit has an internal memory unit. Each MAC unit out of MAC units 41, 43, 46 and 48 includes an internal memory unit that can store channel information from multiple communication channels. These MAC unit are also adapted to apply TDM techniques and to detect under-runs. FIG. 2 illustrates in better details some components of a MAC unit, such as MAC unit 41.

FIG. 2 illustrates a memory unit 110, a shift register 130 and shift register logic 150, according to an embodiment of the invention.

It is assumed, for simplicity of explanation that first processor 61 communicates with the components of MAC unit 41.

Memory unit 110 includes multiple entries. The entries are grouped so that channel information of a first communication channel is stores at a group of entries denoted 110(1). Channel information of a second communication channel is stores at a group of entries denoted 110(2). Assuming that there are K different communication channels that are serviced by MAC Unit 41 then memory unit 110 includes K groups of entries and the channel information of the K'th communication channel is stored at a group of entries denoted 110(K). Each group of entries can define a stack, but this is not necessarily so. It is noted that each group of entries (such as 110(k), whereas k ranges between 1 and K) can include a single entry.

The inventors used groups of entries that included two bytes each, but this is not necessarily so and groups of other sized can be used.

According to an embodiment of the invention channel information can be provided to the transmit memory units 92, 93, 96 and 98, and only a portion of the channel information is provided to memory unit 110, so that the processors 61, 65 will read only a limited amount of information when they perform the read-modify-write operation.

Thus, a dual stage pipeline can be provided by utilizing the memory units within MAC units 41, 43, 46 and 48 as well as transmit memory units 92, 93, 96 and 98.

Conveniently, the memory unit 110 also stores communication channel enable information. The information can stored within entries groups 110(1)-110(K) but this is not necessarily so.

According to an embodiment of the invention the content of the shift register, at an end of a time slot allocated to a certain communication channel is sent back to the respective group of entries, and it can indicate whether the communication channel is enabled or disabled. The latter is indicated, for example, if the stored content of the shift register equals a predefined communication channel disable code.

The memory unit controller 120 is connected to the memory unit 110 and determines, according to an allocations of time slots per communication channels, which information to provide to shift register 130. The memory unit controller 120 can also control a retrieval of the content of the shift register to the appropriate location once the time slot ends.

Shift register 130 is illustrated as having multiple cells 131-147. It is noted that the number of cells can differ from the seventeen cells illustrated in FIG. 2. One bit is allocated for the stop bit while the other sixteen bits can store channel information.

Shift register 130 is connected to memory unit 110 and to shift register logic 150. The shift register logic 150 is adapted to replace channel information outputted by shift register 130 by a predefined content such that when the shift register 130 stores the communication channel disable code an under-run is detected.

Conveniently, once an under-run is detected (for example, by under-run detector 152) the communication channel that is that experienced an under-run is defined as a disabled communication channel. The definition can involve sending an under-run indication to processor 61, to memory unit 110 or to other components of device 10. The definition can involve storing a communication channel disable indication in memory unit 110.

Conveniently, the content of shift register 130 (which equals the communication channel disable code) is stored at the appropriate entry group. According to an embodiment of the invention the memory unit controller 120 can be responsive to sending the communication disable code to a predefined location within the memory unit.

The shift register logic 150 is further adapted to transmit, via the communication line interface 140, idle signals during the at least one later time slot allocated to disabled communication channel and to transmit channel information from enabled communication channels.

According to an embodiment of the invention the content of the shift register 130 is written back to one or more entries allocated for storing channel information of that communication channel. The content of the shift register, at an end of a time slot allocated to the k'th channel is sent to the k'th group of entries 110(k).

First processor 61 performs a read modify write operation for providing new channel information to the memory unit 110. Once the first processor 61 reads the communication channel disable code it does not complete the modify operation—it does not write new channel information to the memory unit 110.

It is noted that the shift register logic 150 can send a request to receive new channel information once the stop bit reaches a certain location. The inventors used a shift register logic 150 that sent a request once eight bits out of sixteen bits were transmitted. The location of the stop bit can be determined by a stop bit locator 157. It is noted that the stop bit locator 157 can be unified with the under-run detector 158.

According to an embodiment of the invention the first processor 61 is adapted to enable a disabled communication channel. This is conveniently performed by performing a write operation (instead of a read-modify-write operation) and inserting a stop bit. According to other embodiments of the invention the stop bit can inserted by the shift register logic 150, or even by the processor (by ignoring the communication channel disable code).

According to another embodiment of the invention the first processor 61 completes the read modify operation by overwriting the communication channel disable code that was previously stored in memory unit 110. During the next time slot allocated to that enabled communication channel the new channel information (that was written over the code) is sent to the shift register 130 and then transmitted.

According to an embodiment of the invention channel information is characterized by a stop bit and the communication channel disable code lacks the stop bit. The stop bit can be inserted by the first processor 61, or by the predetermined code generator 158.

Conveniently, the shift register logic 150, and especially the predetermined content generator 158 is adapted to pad the content of shift register 130 with digits that have the same value and the communication channel disable code consists only of digits that have that value. This value can be zero or one depending on the polarity of the stop bit used.

Conveniently shift register logic 150 includes an under-run detector 152. If the communication channel disable code is a string of zero-valued digits and the stop bit value is one then an under-run can be detected (for example by using an OR gate) if the shift register 130 stores only zeros.

The shift register 130 is serially connected to one input of multiplexer 156. Another input of multiplexer 156 is connected to an idle signal generator 154. An under-run detector 152 selects if the multiplexer 156 transmits a signal that is outputted from shift register 130 of from the idle signal generator 154.

The inventors used the illustrated device to support various channel. Some communication channels transmitted one or few bits per time slot while other communication channels transmitted few bytes per time slot. Conveniently. When the number of transmitted bytes per time slot exceeds few bytes then only a portion of the channel information is provided to the processor during the read-modify operation. It is further noted that the response period of the processor to requests to receive new channel information is not fixed. Due to this uncertainty the processor reads the content of the shift register and determines the amount of new channel information to insert.

TABLE 1 further illustrated various exemplary operations that are executed by device 10, according to an embodiment of the invention. It is assumed that five communication channels share a single communication line and that each communication channel can transmit for one fifth of the time. It is further assumed that four bits are transmitted per time slot, that a request to receive new channel information is generated after eight bits are transmitted, that the stop bit is "1" and is followed (padded) by zero bits, and that "X" represents channel information.

TABLE 1

| Time slot | Selected channel | Content that is provided to the shift register at the beginning of the time slot | Content of the shift register at the end of the time slot | remarks |
|---|---|---|---|---|
| T1 | C1 | xxxxxxxxxx1000000 | xxxxxx10000000000 | Request to receive new channel information |
| T2 | C2 | xxxxxxxxxxxx10000 | xxxxxxxx100000000 | Request to receive new |

TABLE 1-continued

| Time slot | Selected channel | Content that is provided to the shift register at the beginning of the time slot | Content of the shift register at the end of the time slot | remarks |
|---|---|---|---|---|
| T3 | C3 | xxxxxxxxxxxxxxx1 | xxxxxxxxxxxx10000 | channel information |
| T4 | C4 | xxxxxxxx100000000 | xxxx1000000000000 | Requested to receive new channel information during previous transmission |
| T5 | C5 | xx100000000000000 | 00000000000000000 | Under-run occurred |
| T6 | C1 | xxxxxx10000000000 | xx1000000000000000 | |
| T7 | C2 | xxxxxxxx100000000 | xxxx1000000000000 | |
| T8 | C3 | xxxxxxxxxxxx10000 | xxxxxxxx100000000 | Request to receive new channel information |
| T9 | C4 | xxxxxxxxxxxxxxx1 | xxxxxxxxxxxx10000 | Processor updated channel information before T9 |
| T10 | C5 | 00000000000000000 | 00000000000000000 | Communication channel disabled |

Figure 3:
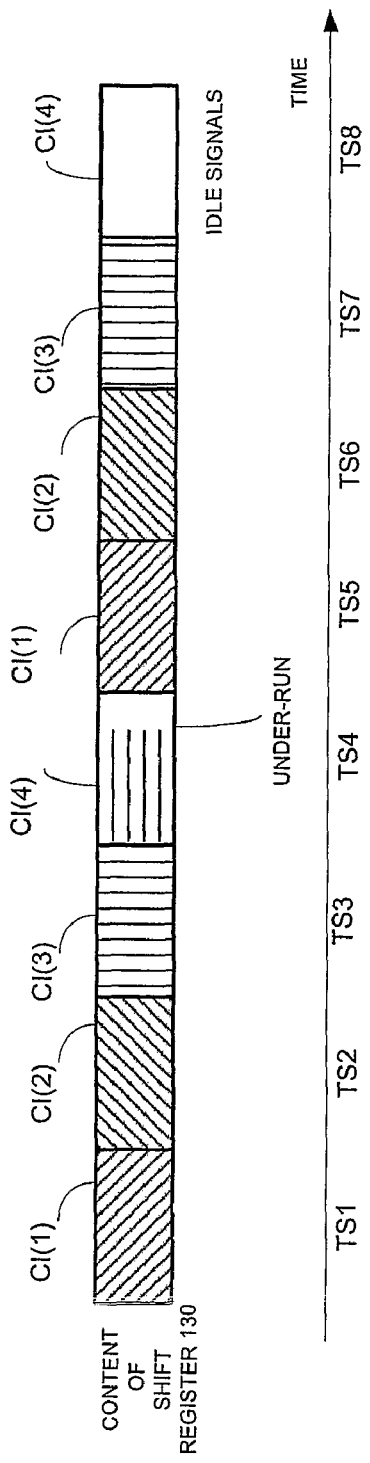
FIG. 3 illustrates an exemplary transmission sequence, according to an embodiment of the invention.

FIG. 3 illustrates an exemplary transmission sequence, according to an embodiment of the invention.

It is assumed that four communication channels share a single communication line and that each communication channel can access that communication line during one fourth of the time.

It is noted that the number of communication channels that share a communication line can differ from four and that the allocation of time slots between different communication channels is not necessarily even.

The first and fifth time slots (TS1 and TS5) are allocated for transmissions from a first communication channel. The second and sixth time slots (TS2 and TS6) are allocated for transmissions from a second communication channel. The third and seventh time slots (TS3 and TS7) are allocated for transmissions from a third communication channel. The fourth and eighth time slots (TS4 and TS8) are allocated for transmissions from a fourth communication channel.

It is assumed that each of the four communication channels is valid when TS1 starts. During TS1 channel information CI(1) from a first enabled communication channel is provided to a shift register and is being serially transmitted from the shift register while the shift register is padded with zeros.

During TS2 channel information CI(2) from a second enabled communication channel is provided to a shift register and is being serially transmitted from the shift register while the shift register is padded with zeros.

During TS3 channel information CI(3) from a third enabled communication channel is provided to a shift register and is being serially transmitted from the shift register while the shift register is padded with zeros.

During TS4 channel information CI(4) from a fourth communication channel is transmitted until an under-run occurs. Due to this under-run the fourth communication channel is defined as a disabled communication channel. During TS5, TS6 and TS7 channel information CI(1), CI(2) and C3(3) from the first, second and third enabled communication channel respectively is provided to the shift register, is being serially transmitted from the shift register while the shift register is padded with zeros During the eights time slot TS8 idle signals are transmitted, as the fourth communication channel is disabled.

Figure 4:
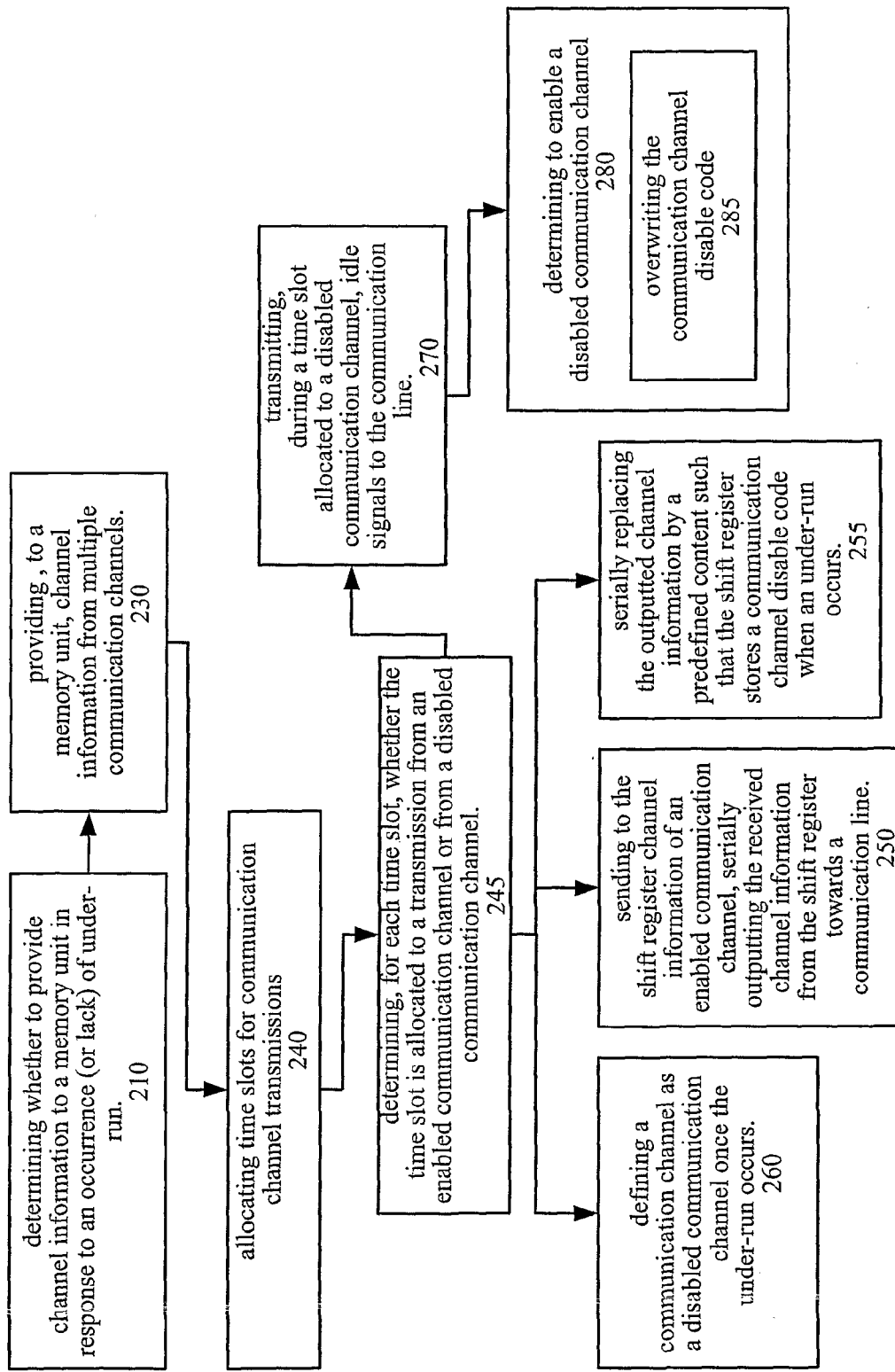
FIG. 4 is a flow chart of a method for managing under-runs, according to an embodiment of the invention.

FIG. 4 is a flow chart of method 200, according to an embodiment of the invention.

Method 200 includes a transmission process and a reception process. The reception process can be executed in parallel to the transmission process, although under-runs that occur during the transmission process may affect the reception process. In addition, the transmission process has to start after a first iteration of the reception process ends.

The reception process includes stages 210-230. Stage 230 can be followed by stage 210 in order to start a new iteration of the reception process. In addition, stage 230 can be followed by stage 240 that starts the transmission process.

Method 200 starts by stage 210 of determining whether to provide channel information to a memory unit in response to an occurrence (or lack) of under-run. Conveniently, if a certain communication channel experienced an under-run (it is a disabled communication channel) then new channel information of that channel is not provided to the memory unit. According to an embodiment of the invention stage 210 includes accessing predefined location in a memory unit in order to determine whether a communication channel is disabled.

Conveniently, the content of the shift register is sent to the memory unit near the end of a time slot so that the content of the shift register can indicate if the communication channel is enabled or disabled.

Stage 210 is followed by stage 230 of providing to a memory unit, channel information from multiple communication channels. Conveniently only information of enabled communication channels is provided.

Stage 230 is followed by stage 240 of allocating time slots for communication channel transmissions. Stage 240 can involve applying various TDM mechanisms, including priority based allocation schemes and the like.

Stage 240 is followed by stage 245 of determining, for each time slot, whether the time slot is allocated for a transmission from an enabled communication channel or from a disabled communication channel.

If the time slot is allocated for a transmission from an enabled communication channel then stage 245 is followed by stages 250, 255 and 260. These stages can be executed in parallel to each other.

Stage 250 includes sending to the shift register channel information of an enabled communication channel and serially outputting the received channel information from the shift register towards a communication line. It is assumed that the whole channel information provided to the shift register will be transmitted during the time slot allocated to the transmission. Else, the non-transmitted channel information can be set back to the memory unit, in order not to loose channel information.

Stage 255 includes serially replacing the outputted channel information by a predefined content such that the shift register stores a communication channel disable code when an under-run occurs.

Conveniently, channel information is characterized by a stop bit and the communication channel disable code lacks the stop bit. Conveniently, the replacing includes padding the content of the shift registers with digits that have the same value and the communication channel disable code consists of digits that have that value. Conveniently, stage 250 of sending includes selectively inserting a stop bit such as to allow a reception of channel information from the memory unit.

Stage 260 includes defining a communication channel as a disabled communication channel once the under-run occurs. The definition includes a generation of an under-run indication that is associated with the communication channel that experienced the under-run. Conveniently, stage 260 includes monitoring the content of the shift register and generating an under-run indication once the shift register stores the communication channel disable code. Conveniently, stage 260 includes storing the communication disable code at predefined memory entry allocated to the disabled communication channel.

If the time slot is allocated for a transmission from a disabled communication channel then stage 245 is followed by stage 270. Stage 270 includes transmitting, during a time slot allocated to a disabled communication channel, idle signals to the communication line.

According to an embodiment of the invention stage 260 can be followed by stage 280 of determining to enable a disabled communication channel. Conveniently, stage 280 includes stage 285 of overwriting the communication channel disable code.

Conveniently, stage 270 of transmitting includes selecting to provide outputs signals from an idle signal generator to a communication line interface and stage 250 of sending includes selecting to provide signals from an output of the shift register.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device, comprising:
    a memory unit;
    a shift register coupled to the memory unit;
    a memory unit controller coupled to the memory unit, and a communication line interface, whereas the memory unit is adapted to store channel information from multiple channels, and whereas the memory unit controller is adapted to control a provision of the channel information from the memory unit to the shift register; and
    shift register logic adapted to replace the channel information outputted by the shift register by a predefined content when the shift register stores a communication channel disable code an under-run is detected;
    whereas a communication channel that experienced the under-run is defined as a disabled communication channel, and whereas the channel information is characterized by a stop bit and whereas the communication channel disable code lacks the stop bit;
    whereas the shift register logic is further adapted to transmit, via the communication line interface, idle signals during the at least one later time slot allocated to the disabled communication channel; and
    whereas the device is adapted to transmit the channel information from enabled communication channels.

2. The device according to claim 1 whereas the memory unit controller is further adapted to control a provision of the communication channel disable code to a predefined memory entry allocated to the disabled communication channel.

3. The device according to claim 2 whereas the device comprises:
    a processor, adapted to access the predefined memory entry in order to determine whether to continue the provision of the channel information of the communication channel.

4. The device according to claim 1, whereas the device comprises:
    a processor, that provides the channel information to the enabled communication channels.

5. The device according to claim 1, whereas the device comprises:
    a processor, coupled to the memory unit, whereas the processor is adapted to overwrite the communication channel disable code.

6. The device according to claim 1, whereas the device comprises:
    a processor that is adapted to enable the disabled communication channel by sending a communication channel enable command.

7. The device according to claim 1, whereas the shift register logic is adapted to pad the content of the shift registers with digits that have the same value and whereas the communication channel disable code consists of digits that have that value.

8. The device according to claim 1, whereas the shift register logic comprises:
    an under-run detector and an idle signal generator that are coupled to a multiplexer, whereas the multiplexer is adapted to select between a serial output of the shift register and an output of the idle signal generator.

9. The device according to claim 1, whereas the shift register logic is adapted to selectively insert the stop bit such as to allow a reception of the channel information from the memory unit.

10. A method, comprising:
    providing, to a memory unit, channel information from multiple channels;
    allocating time slots for communication channel transmissions;

sending, during a time slot allocated for a transmission of the channel information from an enabled communication channel, to the shift register channel information of the enabled communication channel, serially outputting the received channel information from the shift register towards a communication line while serially replacing the outputted channel information by a predefined content and the shift register stores a communication channel disable code when an under-run occurs;

defining a communication channel as a disabled communication channel once the under-run occurs; and transmitting, during a time slot allocated to the disabled communication channel, idle signals to the communication line.

11. The method according to claim 10, further comprising: determining to enable the disabled communication channel.

12. The method according to claim 11 wherein the defining comprises:

storing the communication channel disable code at predefined memory entry allocated to the disabled communication channel.

13. The method according to claim 12 further comprising: accessing the predefined memory entry and determining whether to provide the channel information from the associated communication channel.

14. The method according to claim 11, further comprising: determining whether to provide new channel information to the memory unit in response to an occurrence of the under-run.

15. The method according to claim 11 wherein the determining comprises:

overwriting the communication channel disable code.

16. The method according to claim 11, wherein the channel information is characterized by the stop bit and wherein the communication channel disable code lacks the stop bit.

17. The method according to claim 11, wherein the replacing comprises:

padding the content of the shift registers with digits that have the same value and wherein the communication channel disable code consists of digits that have that value.

18. The method according to claim 11, wherein the transmitting comprises: selecting to provide outputs signals from an idle signal generator to a communication line interface and wherein the sending comprises selecting to provide signals from an output of the shift register.

19. The method according to claim 11, wherein the stage of sending comprises: selectively inserting the stop bit such as to allow a reception of the channel information from the memory unit.

20. A device comprising:

a memory unit;

a shift register coupled to the memory unit;

a communication line for transmitting multiple communication channels;

a memory unit controller coupled to the memory unit, and the communication line, wherein the memory unit is adapted to store channel information from the multiple communication channels, and the memory unit controller is adapted to control a provision of the channel information from the memory unit to the shift register; and shift register logic adapted to replace the channel information outputted by the shift register by a predefined content, and an under-run is detected when the shift register stores a communication channel disable code for a communication channel of the multiple communication channels;

wherein the communication channel of the multiple communication channels on the communication line that experienced the under-run is defined as a disabled communication channel;

wherein the shift register logic is further adapted to transmit, via the communication line interface, idle signals during the at least one later time slot allocated to the disabled communication channel, and wherein the device is adapted to transmit channel information from enabled communication channels.

* * * * *

UNITED STATES PATENT AND TRADEMARK OFFICE
CERTIFICATE OF CORRECTION

PATENT NO. : 8,089,978 B2  Page 1 of 1
APPLICATION NO. : 12/093111
DATED : January 3, 2012
INVENTOR(S) : Glickman et al.

It is certified that error appears in the above-identified patent and that said Letters Patent is hereby corrected as shown below:

Column 12, Line 36, please change "adapted to transmit channel" to --adapted to transmit the channel--

Signed and Sealed this
Twenty-seventh Day of March, 2012

David J. Kappos
*Director of the United States Patent and Trademark Office*